(12) United States Patent
Christiansson et al.

(10) Patent No.: US 9,317,168 B2
(45) Date of Patent: Apr. 19, 2016

(54) TRACKING OBJECTS ON A TOUCH SURFACE

(71) Applicant: FlatFrog Laboratories AB, Lund (SE)

(72) Inventors: Tomas Christiansson, Torna-Hallestad (SE); Nicklas Ohlsson, Bunkeflostrand (SE); Andreas Bjorklund, Lund (SE)

(73) Assignee: FLATFROG LABORATORIES AB, Lund (SE)

( * ) Notice: Subject to any disclaimer, the term of this patent is extended or adjusted under 35 U.S.C. 154(b) by 114 days.

(21) Appl. No.: 14/365,468

(22) PCT Filed: Dec. 10, 2012

(86) PCT No.: PCT/SE2012/051368
§ 371 (c)(1),
(2) Date: Jun. 13, 2014

(87) PCT Pub. No.: WO2013/089622
PCT Pub. Date: Jun. 20, 2013

(65) Prior Publication Data
US 2014/0375607 A1 Dec. 25, 2014

Related U.S. Application Data

(60) Provisional application No. 61/576,550, filed on Dec. 16, 2011.

(30) Foreign Application Priority Data

Dec. 16, 2011 (SE) ........................................ 1151208

(51) Int. Cl.
*G06F 3/041* (2006.01)
*G06F 3/044* (2006.01)
*G06F 3/042* (2006.01)
*G06F 3/0488* (2013.01)

(52) U.S. Cl.
CPC .............. *G06F 3/044* (2013.01); *G06F 3/0418* (2013.01); *G06F 3/0421* (2013.01); *G06F 3/04883* (2013.01); *G06F 2203/04109* (2013.01); *G06F 2203/04111* (2013.01)

(58) Field of Classification Search
None
See application file for complete search history.

(56) References Cited

U.S. PATENT DOCUMENTS

| 7,932,899 B2 | 4/2011 | Newton et al. |
| 2006/0202974 A1 | 9/2006 | Thielman |
| 2009/0278816 A1 | 11/2009 | Colson |
| 2010/0079408 A1 | 4/2010 | Leong et al. |
| 2010/0245292 A1 | 9/2010 | Wu |

(Continued)

FOREIGN PATENT DOCUMENTS

| WO | WO-0235460 A1 | 5/2002 |
| WO | WO-2009/137355 A2 | 11/2009 |

(Continued)

OTHER PUBLICATIONS

Supplementary European Search Report dated Jun. 30, 2015 issued in corresponding European Application No. 12857303.

(Continued)

*Primary Examiner* — Adam R Giesy
(74) *Attorney, Agent, or Firm* — Harness, Dickey & Pierce, P.L.C.

(57) ABSTRACT

A device implements a method of tracking objects on a touch surface of an FTIR based touch-sensitive apparatus.

18 Claims, 7 Drawing Sheets

(56) References Cited

U.S. PATENT DOCUMENTS

| | | | |
|---|---|---|---|
| 2010/0283785 A1 | 11/2010 | Satulovsky | |
| 2010/0322550 A1 | 12/2010 | Trott | |
| 2011/0050649 A1 | 3/2011 | Newton et al. | |
| 2011/0074735 A1 | 3/2011 | Wassvik et al. | |
| 2012/0062474 A1* | 3/2012 | Weishaupt | G06F 3/0416 345/173 |
| 2012/0162144 A1 | 6/2012 | Fahraeus et al. | |
| 2012/0200538 A1 | 8/2012 | Christiansson et al. | |
| 2012/0212441 A1 | 8/2012 | Christiansson et al. | |
| 2013/0269867 A1 | 10/2013 | Trott | |

FOREIGN PATENT DOCUMENTS

| | | |
|---|---|---|
| WO | WO-2010/006882 A2 | 1/2010 |
| WO | WO-2010/006883 A2 | 1/2010 |
| WO | WO-2011/028169 A1 | 3/2011 |
| WO | WO-2011/049512 A1 | 4/2011 |
| WO | WO-2011/049513 A1 | 4/2011 |

OTHER PUBLICATIONS

International Search Report and Written Opinion dated Jul. 3, 2013 issued in corresponding International Application No. PCT/SE2012/051368.

* cited by examiner

TRACKING OBJECTS ON A TOUCH SURFACE

CROSS-REFERENCE TO RELATED APPLICATIONS

The present application claims the benefit of Swedish patent application No. 1151208-4, filed 16 Dec. 2011, and U.S. provisional application No. 61/576,550, filed 16 Dec. 2011, both of which are incorporated herein by reference.

TECHNICAL FIELD

The present invention relates to techniques for tracking objects on a touch surface, in particular a touch surface of a touch-sensitive apparatus that operates by propagating light inside a light transmissive panel from a plurality of incoupling points to a plurality of outcoupling points so as to illuminate the touch surface from within the panel.

BACKGROUND ART

Touch sensing systems ("touch systems") are in widespread use in a variety of applications. Typically, the touch systems are actuated by a touch object such as a finger or stylus, either in direct contact, or through proximity (i.e. without contact), with a touch surface. Touch systems are for example used as touch pads of laptop computers, in control panels, and as overlays to displays on e.g. hand held devices, such as mobile telephones. A touch panel that is overlaid on or integrated in a display is also denoted a "touch screen". Many other applications are known in the art.

To an increasing extent, touch systems are designed to be able to detect two or more touches simultaneously, this capability often being referred to as "multi-touch" in the art.

There are numerous known techniques for providing multi-touch sensitivity, e.g. by using cameras to capture light scattered off the point(s) of touch on a touch panel, or by incorporating resistive wire grids, capacitive sensors, strain gauges, etc into a touch panel.

WO2011/028169 and WO2011/049512 disclose multi-touch systems that are based on frustrated total internal reflection (FTIR). Light sheets are coupled into a panel to propagate inside the panel by total internal reflection (TIR). When an object comes into contact with a touch surface of the panel, the propagating light is attenuated at the point of touch. The transmitted light is measured at a plurality of outcoupling points by one or more light sensors. The signals from the light sensors are processed for input into an image reconstruction algorithm that generates a 2D representation of interaction across the touch surface. This enables repeated determination of current position/size/shape of touches in the 2D representation while one or more users interact with the touch surface.

The touches need to be detected in the presence of interferences, such as measurement noise, ambient light, contamination on the touch surface (e.g. fingerprints and other types of smear), vibrations, etc. These interferences may vary not only over time but also across the touch surface, making it difficult to properly detect the touches on the touch surface at all times. Furthermore, the degree of interaction between a touching object and the touch surface may vary both over time and between different objects. For example, the interaction may depend on if an object is tapped, dragged or held in a fixed position onto the touch surface. Different objects may yield different degree of interaction, e.g. the degree of interaction may vary between fingers of a user, and even more so between the fingers of different users.

The combination of several touches, complex gestures as well as temporal and spatial variations of interaction and interferences will make the identification of touches a demanding task. The user experience may be hampered if, e.g., an ongoing gesture on a touch screen is interrupted by the system failing to detect certain touches during the gesture.

The above-mentioned WO2011/028169 and WO2011/049512 propose different techniques to suppress the influence of contamination, e.g. by compensating the 2D representation by an intermittently updated 2D background status that estimates the interaction caused by contamination, or by normalizing the measurement signals by reference values that are intermittently updated to represent the influence of contamination. To the extent that such a suppression is incomplete, or other types of interferences are present, the 2D representation may still contain false peaks that are mistaken for touching objects.

The prior art also comprises WO2010/006883 which discloses a technique for touch determination in an optical multi-touch system, where attenuated light paths are identified and processed for determining a set of candidate touches, which may include true touches as well as ghost touches. The candidate positions are then validated based the shape and/or area of each candidate touch, allowing the ghost touches to be identified and eliminated from further processing.

The present Applicant has identified a need for an improved technique of tracking objects on the touch surface in the presence of interferences.

SUMMARY

It is an objective of the invention to at least partly overcome one or more of the above-identified limitations of the prior art.

Another objective is to enable tracking of objects on a touch surface of a multi-touch system that operates by FTIR.

A further objective is to enable such tracking based on a 2D representation of interaction on a touch surface, even if the 2D representation contains peaks caused by interferences.

One or more of these objectives, as well as further objectives that may appear from the description below, are at least partly achieved by means of a method, a computer program product, a device and a touch-sensitive apparatus according to the independent claims, embodiments thereof being defined by the dependent claims.

A first aspect of the invention is a method of tracking movement of one or more objects on a touch surface of a touch-sensitive apparatus, based on an output signal of the apparatus. The apparatus is operable to propagate light by internal reflections inside a light transmissive panel from a plurality of incoupling points to a plurality of outcoupling points so as to illuminate the touch surface from within the light transmissive panel, wherein at least one light detector is optically coupled to the outcoupling points to generate the output signal representing received light at the outcoupling points. The method comprises the steps of: processing the output signal to generate an interaction map that indicates local changes in interaction on the touch surface; processing the interaction map for identification of positive and negative apparent peaks, wherein each positive apparent peak represents a locally increased interaction in the interaction map and each negative apparent peak represents a locally decreased interaction in the interaction map; processing the positive and negative apparent peaks to identify potentially false peaks among the positive and negative apparent peaks; and updating, based on the potentially false peaks, movement trajectories of all objects deemed to exist on the touch surface at a preceding time point; wherein the step of processing the positive and negative apparent peaks applies at least one of a first heuristic and a second heuristic for identifying the potentially false peaks, said first heuristic designating a positive apparent peak as a potentially false peak when the positive apparent peak is deemed to be associated with one or more of the negative apparent peaks, and said second heuristic designating a positive apparent peak as a potentially false peak when the positive apparent peak is deemed to be located along one of the movement trajectories.

The method of the first aspect, when executed at consecutive time points, results in movement trajectories that are updated at each time point to represent all objects that are deemed to exist on the touch surface at that time point. As used herein, a movement trajectory represents a time sequence of locations for one object on the touch surface. The method thus tracks the movement of objects on the touch surface. Although not stated above, it is implicit to the method that it comprises a step of processing the interaction map for identifying true peaks among the positive and negative peaks, i.e. peaks that are safely deemed to correspond to an object that is controlled by a user of the touch-sensitive apparatus, and a step of updating the movement trajectories based on the true peaks. This is the conventional way of tracking movement of objects of a touch surface.

The method of the first aspect validates the positive and negative apparent peaks, to identify potentially false peaks in the interaction map, and updates the movement trajectories based on the outcome of the validation. In contrast to true peaks, false peaks are peaks that do not correspond to an object that is controlled by the user. One challenge when identifying the potentially false peaks is to reduce the number of apparent peaks that are erroneously identified as new touches, while ensuring that those apparent peaks that indeed represent new touches are not mistaken for false peaks. Errors introduced into the movement trajectories may propagate, and even be enhanced, as the movement trajectories are updated over time. To contain this risk, the method of the first aspect applies the first and/or second heuristic which makes use of inherent characteristics of the touch-sensitive apparatus when validating the apparent peaks. These inherent characteristics relate to how true peaks are known to show up in the interaction map. For example, an existing object, moving or not, will show up as an apparent peak in the interaction map at a location relatively close to its previous location, i.e. its location at the preceding time point. Furthermore, new objects that are brought into proximity with the touch surface will appear as positive peaks, i.e. peaks of locally increased interaction in the interaction map.

The inherent characteristics also relate to how certain false peaks are known to show up in the interaction map. Specifically, the first and second heuristics are designed to handle specific types of interferences. The first heuristic is designed to identify false peaks originating from light scattering caused by objects and contamination on the touch surface. Such scattering has been found to cause a redistribution of energy at the outcoupling points which results in an interaction map with one or more negative peaks in the vicinity of the true peak, i.e. the positive peak that corresponds to the object. The redistribution of energy may also lead to one or more further positive peaks in the vicinity of the true peak. The second heuristic is designed to identify false peaks originating from changes in the contamination on the touch surface caused by the movement of the object(s). Such changes in contamination, also denoted "residue changes" herein, may be caused by the object leaving behind a trail of contamination and/or wiping away existing contamination on the touch surface. Such residue changes may result in one or more positive peaks along the movement trajectory of the object.

Depending on the impact of different types of interferences in a specific touch-sensing apparatus, the first and/or second heuristic may be applied to identify potentially false peaks among the apparent peaks, while still being able to identify apparent peaks representing new touches.

It should also be noted that the first and/or second heuristic may be able to identify false peaks originating from other types of interferences, including but not limited to incomplete contamination compensation, ambient light and measurement noise.

In one embodiment, the first heuristic is designed to further require said one or more of the negative apparent peaks to be located outside the movement trajectories. Such an embodiment may e.g. be applicable when the interaction map is known to represent objects by negative apparent peaks, and it is thus conceivable that negative apparent peaks occur along the movement trajectories. To improve the accuracy of the potentially false peaks that are identified, the first heuristic may be designed to exclude such negative apparent peaks.

In one embodiment, with respect to the first heuristic, the positive apparent peak is deemed to be associated with said one or more negative apparent peaks when the positive apparent peak has a given spatial relation to said one or more negative apparent peaks. The given spatial relation may define a maximum distance between the positive apparent peak and said one or more negative peaks. In an alternative, the given spatial relation may be represented by one or more predetermined patterns of positive and negative apparent peaks in the interaction map.

In one embodiment, the step of processing the negative and positive apparent peaks comprises a step of matching at least part of the positive and negative apparent peaks to the movement trajectories, so as to identify a set of matched apparent peaks and a set of non-matched apparent peaks.

In one embodiment, the second heuristic further requires, to designate the positive apparent peak as a potentially false peak, that the positive apparent peak is included in said set of non-matched apparent peaks. This may prevent a true peak representing an object that crosses an existing movement trajectory from being identified as a potentially false touch.

In one embodiment, the second heuristic further requires, to designate the positive apparent peak as a potentially false peak, that the positive apparent peak is located within a maximum distance from a current location of said one of the movement trajectories. This may prevent a new touch that occurs in an existing movement trajectory from being identified as a potentially false touch. In one embodiment, the maximum distance is a distance along said one of the movement trajectories, and the second heuristic is configured to dynamically set the maximum distance to increase with increasing velocity of said one of the movement trajectories. This embodiment is based on the insight that fast moving objects quickly leave the residue changes behind on the touch surface, and that these residue changes may be mistaken for new touches unless care is taken when setting the maximum distance. By setting the maximum distance as a function of velocity (in contrast to an absolute distance), it is ensured that only the most recent part of the movement trajectory is evaluated by the second heuristic when identifying the potentially false peaks.

In one embodiment, the step of updating comprises: evaluating, based on the potentially false peaks, the positive and negative apparent peaks for determination of a current location for at least part of the movement trajectories; evaluating, based on the potentially false peaks, the positive and negative apparent peaks for identification of new touches; and adding the location of each of said new touches as a starting point of a new movement trajectory. In one embodiment, the step of updating comprises: preventing the identification of new touches based on the potentially false peaks. In one embodiment, the method operates in successive repetitions of the steps of processing and updating, and the identification of new touches based on the potentially false peaks is prevented during a number of successive repetitions for at least part of the potentially false peaks, thereby postponing the identification of new touches.

In one embodiment, the step of updating comprises at least one of: updating the movement trajectories based on said at least part of the positive and negative apparent peaks while omitting all potentially false peaks; updating the movement trajectories based on said at least part of the positive and negative apparent peaks while applying a respective peak probability value indicative of the potentially false peaks; postponing the updating of at least a subset of movement trajectories that are deemed to be associated with the potentially false peaks; creating tentative movement trajectories for at least a subset of the potentially false peaks; postponing the updating of movement trajectories that are deemed to be associated with one or more uncertainty regions containing the potentially false peaks in the interaction map.

The step of processing the apparent positive and negative apparent peaks, i.e. the validation, may be seen to generate validation data in some form, and the step of updating the movement trajectories may be seen to operate on this validation data. The step of updating may differ depending on validation data.

In a first example, the validation data designates a set of the apparent peaks as either false or true. In a second example, the validation data assigns probability values to the apparent peaks indicating a likelihood that the respective apparent peak is false (or equivalently, true). This may enable more sophisticated updating, e.g. to account for uncertainties in the identification of the potentially false peaks. In a third example, the validation data indicates one or more uncertainty regions in the interaction map. The extent of the respective uncertainty region may be fixed or be adjusted with respect to the extent and relative locations of certain apparent peaks and/or movement trajectories.

In one embodiment, the step of processing the output signal comprises: processing the output signal to identify signal values for a plurality of light paths extending between pairs of incoupling and outcoupling points, and generating the interaction map by operating an image reconstruction algorithm on the signal values. The interaction map may be generated to represent changes in interaction on any time scale. In one example, the interaction map may be generated to represent the factual touch interaction across the touch surface at the current time point. Such an interaction map will represent changes in interaction on a long time scale, e.g. all interaction changes since startup or calibration of the touch-sensitive apparatus. This interaction map may thus represent an instant "snapshot" of the distribution of interaction across the touch surface. In another example, the interaction map is generated to indicate temporal changes in interaction on a shorter time scale, e.g. in the approximate range of 5 ms-5 s. Irrespective of implementation, the interaction map may or may not be compensated for the influence of contamination on the touch surface, e.g. according to the prior art techniques discussed in the Background section.

In one embodiment, the interaction is represented as one of an attenuation and a transmission of said light. Thus, depending on implementation, a positive apparent peak, which represents a locally increased interaction, may actually be represented by a local maximum or minimum in the interaction map.

In one embodiment, the method further comprises a step of identifying current touch data for at least part of the updated movement trajectories, and outputting the touch data. The touch data may thus represent all true touches, or a subset of the true touches. The touch data may comprise any combination of a location on the touch surface, a size, a shape and an application pressure onto the touch surface.

In one embodiment, the method further comprises: retrieving, from an electronic memory, a data structure indicative of the movement trajectories of all objects deemed to exist on the touch surface at the preceding time point, wherein the step of updating comprises updating the movement trajectories in the data structure, and storing the updated data structure in the electronic memory.

A second aspect of the invention is a computer program product comprising computer code which, when executed on a data-processing system, is adapted to carry out the method of the first aspect.

A third aspect of the invention is a device for tracking movement of one or more objects on a touch surface of a touch-sensitive apparatus. The touch-sensitive apparatus is operable to propagate light by internal reflections inside a light transmissive panel from a plurality of incoupling points to a plurality of outcoupling points so as to illuminate the touch surface from within the light transmissive panel, wherein a light sensing means is optically coupled to the outcoupling points to generate an output signal representing received light at the outcoupling points. The device comprises: means for processing the output signal to generate an interaction map that indicates local changes in interaction on the touch surface; means for processing the interaction map for identification of positive and negative apparent peaks, wherein each positive apparent peak represents a locally increased interaction in the interaction map and each negative apparent peak represents a locally decreased interaction in the interaction map; means for processing the positive and negative apparent peaks to identify potentially false peaks among the positive and negative apparent peaks; and means for updating, based on the potentially false peaks, movement trajectories of all objects deemed to exist on the touch surface at a preceding time point; wherein the means for processing the positive and negative apparent peaks is configured to apply at least one of a first heuristic and a second heuristic for identifying the potentially false peaks, said first heuristic designating a positive apparent peak as a potentially false peak when the positive apparent peak is deemed to be associated with one or more of the negative apparent peaks, and said second heuristic designating a positive apparent peak as a potentially false peak when the positive apparent peak is deemed to be located along one of the movement trajectories.

A fourth aspect of the invention is a device for tracking movement of one or more objects on a touch surface of a touch-sensitive apparatus. The touch-sensitive apparatus is operable to propagate light by internal reflections inside a light transmissive panel from a plurality of incoupling points to a plurality of outcoupling points so as to illuminate the touch surface from within the light transmissive panel, wherein at least one light detector is optically coupled to the outcoupling points to generate an output signal representing received light at the outcoupling points. The device comprises: an input for the output signal; and a signal processor configured to: process the output signal to generate an interaction map that indicates local changes in interaction on the touch surface; process the interaction map for identification of positive and negative apparent peaks, wherein each positive apparent peak represents a locally increased interaction in the interaction map and each negative apparent peak represents a locally decreased interaction in the interaction map; process the positive and negative apparent peaks to identify potentially false peaks among the positive and negative apparent peaks; and update, based on the potentially false peaks, movement trajectories of all objects deemed to exist on the touch surface at a preceding time point; wherein the signal processor is further configured to apply at least one of a first heuristic and a second heuristic for identifying the potentially false peaks, said first heuristic designating a positive apparent peak as a potentially false peak when the positive apparent peak is deemed to be associated with one or more of the negative apparent peaks, and said second heuristic designating a positive apparent peak as a potentially false peak when the positive apparent peak is deemed to be located along one of the movement trajectories.

A fifth aspect of the invention is a touch-sensitive apparatus, comprising: a light transmissive panel configured to propagate light by internal reflections from a plurality of incoupling points to a plurality of outcoupling points so as to illuminate the touch surface from within the light transmissive panel; means for providing the light at the incoupling points; means for generating an output signal representing received light at the outcoupling points; and the device for tracking movement of one or more objects according to the third or fourth aspect.

A sixth aspect of the invention is a touch-sensitive apparatus, comprising: a light transmissive panel configured to propagate light by internal reflections from a plurality of incoupling points to a plurality of outcoupling points so as to illuminate the touch surface from within the light transmissive panel; at least one light emitter optically coupled to the incoupling points to provide the light; at least one light detector optically coupled to the outcoupling points to generate an output signal representing received light at the outcoupling points; and the device for tracking movement of one or more objects according to the third or fourth aspect.

Any one of the above-identified embodiments of the first aspect may be adapted and implemented as an embodiment of the second to sixth aspects.

Still other objectives, features, aspects and advantages of the present invention will appear from the following detailed description, from the attached claims as well as from the drawings.

BRIEF DESCRIPTION OF DRAWINGS

Embodiments of the invention will now be described in more detail with reference to the accompanying schematic drawings.

DETAILED DESCRIPTION OF EXAMPLE EMBODIMENTS

Figure 1A:
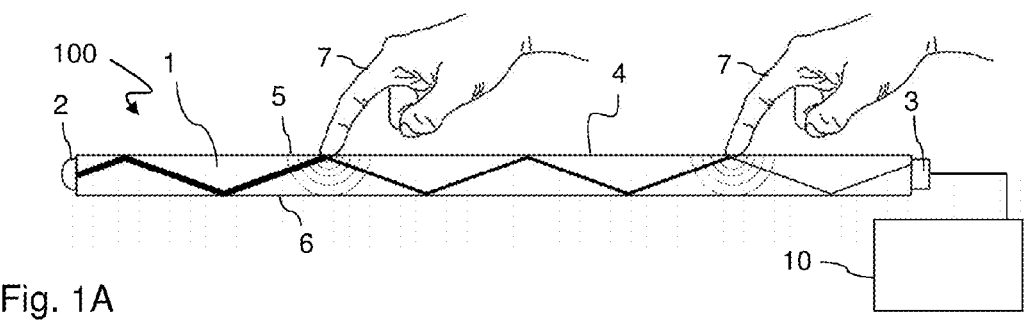
FIGS. 1A-1B are section and top plan views of a touch-sensing FTIR system.

Before describing embodiments of the invention, a few definitions will be given.

A "touch object" or "touching object" is a physical object that actively or intentionally touches, or is brought in sufficient proximity to, a touch surface so as to be detected by one or more sensors in the touch system. The physical object may be animate, e.g. a finger, or inanimate.

An "interaction" occurs when the touch object affects a parameter measured by the sensor.

An "interaction strength" is a relative or absolute measure of the degree of interaction.

An "interaction map" or "interaction pattern" is a two-dimensional (2D) distribution of interaction across the touch surface, or a portion thereof. If the "interaction map" contains attenuation values, it is also denoted an "attenuation map" or "attenuation pattern".

A "touch" denotes a point of interaction as seen in the interaction pattern. A touch may be associated with different touch parameters, such as a location on the touch surface in any coordinate system, an interaction strength, a size (e.g. diameter, area, etc), a shape, etc.

A "frame" or "iteration" denotes a repeated event starting with data collection and ending with determination of touch data. The touch data may comprise or be based on any combination of touch parameters.

As used herein, a "trace" is information about the temporal history of an interaction. Touches from an interaction detected in a sequence of frames, i.e. at different points in time, are collected into a trace.

A trace may be associated with different trace parameters, such as an age, a location, a location history, a size, a shape, etc. The "age" of a trace indicates how long the trace has existed, and may be given as a number of frames, the frame number of the earliest touch in the trace, a time period, etc. The "location" of the trace is given by the location of the most recent touch in the trace, and the "size" of a trace denotes the size of the most recent touch in the trace. The "location history" or "movement trajectory" denotes at least part of the spatial extension of the trace across the touch surface, e.g. given as the locations of the latest few touches in the trace, or the locations of all touches in the trace, a curve approximating the shape of the trace, or a Kalman filter.

Throughout the following description, the same reference numerals are used to identify corresponding elements.

1. Touch-Sensitive Apparatus

Figure 1B:
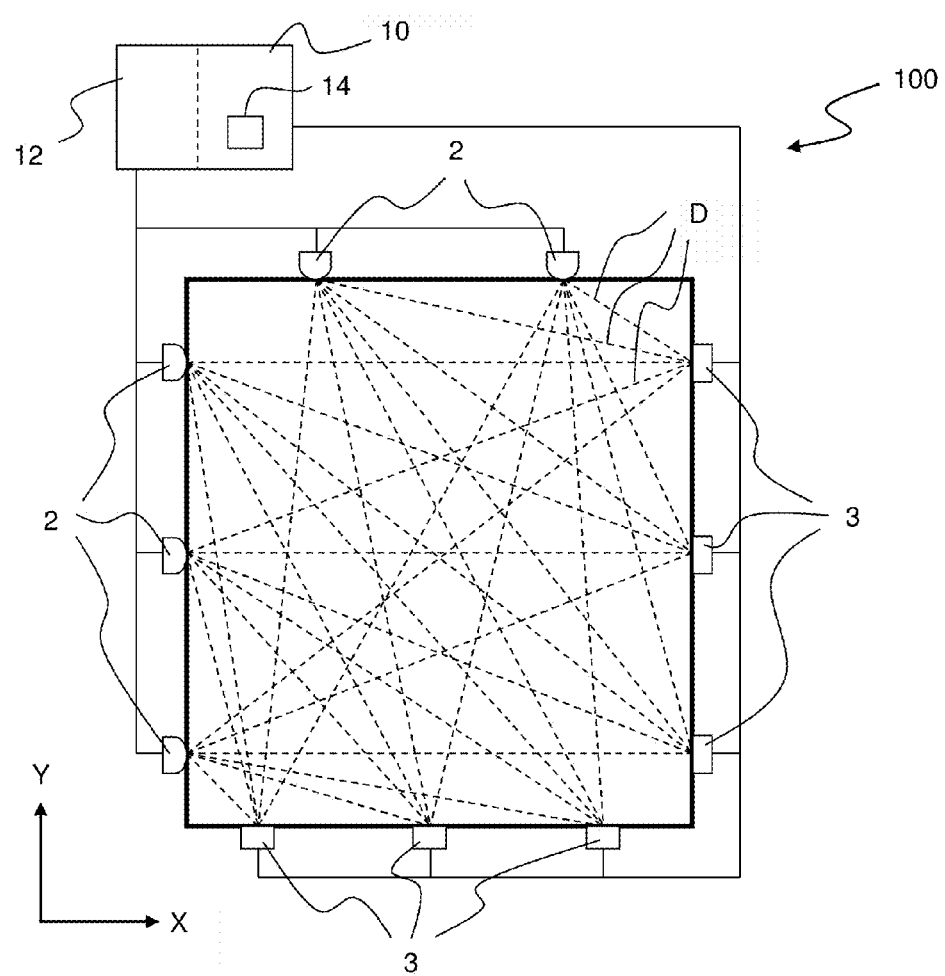

FIGS. 1A-1B illustrate an example embodiment of a touch-sensitive apparatus 100 that is based on the concept of FTIR (Frustrated Total Internal Reflection), also denoted "FTIR system". The apparatus operates by transmitting light inside a panel 1, from light emitters 2 to light sensors or detectors 3, so as to illuminate a touch surface 4 from within the panel 1. The panel 1 is made of solid material in one or more layers and may have any shape. The panel 1 defines an internal radiation propagation channel, in which light propagates by internal reflections. In the example of FIG. 1, the propagation channel is defined between the boundary surfaces 5, 6 of the panel 1, where the top surface 5 allows the propagating light to interact with touching objects 7 and thereby defines the touch surface 4. This is achieved by injecting the light into the panel 1 such that the light is reflected by total internal reflection (TIR) in the touch surface 4 as it propagates through the panel 1. The light may be reflected by TIR in the bottom surface 6 or against a reflective coating thereon. It is also conceivable that the propagation channel is spaced from the bottom surface 6, e.g. if the panel comprises multiple layers of different materials. The apparatus 100 may be designed to be overlaid on or integrated into a display device or monitor.

The apparatus 100 allows an object 7 that is brought into close vicinity of, or in contact with, the touch surface 4 to interact with the propagating light at the point of touch. In this interaction, part of the light may be scattered by the object 7, part of the light may be absorbed by the object 7, and part of the light may continue to propagate in its original direction across the panel 1. Thus, the touching object 7 causes a local frustration of the total internal reflection, which leads to a decrease in the energy (power/intensity) of the transmitted light, as indicated by the thinned lines downstream of the touching objects 7 in FIG. 1A.

The emitters 2 are distributed along the perimeter of the touch surface 4 to generate a corresponding number of light sheets inside the panel 1. In the example of FIG. 1B, each emitter 2 generates a beam of light that expands in the plane of the panel 1 while propagating in the panel 1. Each beam propagates from one or more entry or incoupling points (ports) on the panel 1. The sensors 3 are distributed along the perimeter of the touch surface 4 to receive the light from the emitters 2 at a number of spaced-apart outcoupling points (ports) on the panel 1. It should be understood that the incoupling and outcoupling points merely refer to the position where the beam enters and leaves, respectively, the panel 1. Thus, one emitter/sensor may be optically coupled to a number of incoupling/outcoupling points. In the example of FIG. 1B, however, the detection lines D are defined by individual emitter-sensor pairs.

The sensors 3 collectively provide an output signal, which is received and sampled by a signal processor 10. The output signal contains a number of sub-signals, also denoted "projection signals", each representing the energy of light emitted by a certain light emitter 2 and received by a certain light sensor 3. Depending on implementation, the signal processor 10 may need to process the output signal for separation of the individual projection signals. Conceptually, the touch apparatus 100 is considered to define a grid of detection lines D on the touch surface 4, where each detection line D corresponds to a light propagation path from an emitter 2 to a sensor 3, as projected onto the touch surface 4. Thus, the projection signals represent the received energy or power of light on the individual detection lines D. It is realized that the touching object 7 results in a decrease (attenuation) of the received energy on one or more detection lines D.

As will be explained below, the signal processor 10 may be configured to process the projection signals so as to determine a distribution of attenuation values (for simplicity, referred to as an "attenuation pattern") across the touch surface 1, where each attenuation value represents a local attenuation of light. The attenuation pattern may be represented in many different ways, e.g. as attenuation values arranged in a regular x-y-grid, such as in an ordinary digital image, although other types of grids are conceivable, e.g. hexagonal patterns or triangular meshes. The attenuation pattern may be further processed by the signal processor 10 or by a separate device (not shown) for touch determination, which may involve extraction of touch data, such as a position (e.g. x,y coordinates), a shape or an area of each touching object.

In the illustrated example, the apparatus 100 also includes a controller 12 which is connected to selectively control the activation of the emitters 2 and, possibly, the readout of data from the sensors 3. The signal processor 10 and the controller 12 may be configured as separate units, or they may be incorporated in a single unit. One or both of the signal processor 10 and the controller 12 may be at least partially implemented by software executed by a processing unit 14.

It is to be understood that FIG. 1 merely illustrates one example of an FTIR system. For example, the detection lines may instead be generated by sweeping or scanning one or more beams of light inside the panel 1, and the light may instead be coupled into and out of the panel 1 via the top and bottom surfaces 5, 6, e.g. by the use of dedicated coupling elements attached to the panel 1. Examples of alternative FTIR systems are e.g. disclosed in U.S. Pat. No. 6,972,753, U.S. Pat. No. 7,432,893, US2006/0114237, US2007/0075648, WO2009/048365, WO2010/006882, WO2010/006883, WO2010/006884, WO2010/006885, WO2010/006886, WO2010/064983, and WO2010/134865, which are all incorporated herein by this reference. The inventive concept may be applied to such alternative FTIR systems as well.

2. Attenuation Pattern

A reconstruction function or algorithm may be used for determining the attenuation pattern on the touch surface 4, based on the projection signals in the output signal. Embodiments of the invention may use any available algorithm for image reconstruction based on projection signal values, including tomographic reconstruction methods such as Filtered Back Projection, FFT-based algorithms, ART (Algebraic Reconstruction Technique), SART (Simultaneous Algebraic Reconstruction Technique), etc. Alternatively, the reconstruction function may generate the attenuation pattern by adapting one or more basis functions and/or by statistical methods such as Bayesian inversion. Examples of such reconstruction functions designed for use in touch determination are found in WO 2010/006883, WO2009/077962, WO2011/049511, WO2011/139213 and WO2012/050510, all of which are incorporated herein by reference. Conventional image reconstruction techniques are found in the mathematical literature, e.g. "The Mathematics of Computerized Tomography" by Natterer, and "Principles of Computerized Tomographic Imaging" by Kak and Slaney.

The reconstruction function is designed based on the assumption that the input values $s_t$ at time point t depend on the attenuation pattern, $a_t$, according to a projection function $\mathcal{P}$, which reflects the properties of the physical touch system: $s_t = \mathcal{P}(a_t)$. The reconstruction algorithm is thus designed to reconstruct $a_t$ from $s_t$ by use of a reconstruction function: $a_t = \mathcal{P}'(s_t)$.

It is to be understood that the format of the input values $s_t$ may be specific to the reconstruction function $\mathcal{P}'$. To enable reconstruction of an attenuation pattern, the input values $s_t$ may be represented as attenuation values for individual detection lines. Such attenuation values may e.g. be based on transmission values obtained by dividing the projection value $I_k$ of the k:th detection line by a respective reference value: $T_k = I_k / REF_k$. By proper choice of reference values, the transmission values may be generated to represent the fraction (e.g. in the range [0, 1]) of the available light energy that has been measured on each of the detection lines. The input value of each detection line may e.g. be given by: $s_k = -\log(T_k)$ or an approximation thereof, e.g. $s_k = 1 - T_k$.

The reconstructed attenuation pattern $a_t$ will represent the distribution of accumulated attenuation on the touch surface at time point t. The accumulated attenuation includes both attenuation caused by touching objects and attenuation caused by contaminations on the touch surface, and such an interaction pattern $a_t$ may thus be denoted a "total attenuation pattern" or "total pattern".

As indicated in the Background section, it is known in the art to at least partly compensate the total attenuation pattern $a_t$ for the influence of the contaminations on the touch surface, resulting in a compensated attenuation pattern $o_t$, denoted "touch attenuation pattern" or "offset pattern". For example, WO2011/049512 proposes a touch apparatus which repeatedly generates a current light status (corresponding to the total pattern). The touch apparatus also repeatedly updates a background status (or "back-ground pattern"), which is a two-dimensional distribution of estimated attenuation values caused by contaminations on the touch surface. A compensated light status (corresponding to the offset pattern) is then formed by subtracting the background status from the current light status. An alternative or supplementary compensation technique is proposed in WO2011/028169, in which the reference values ($REF_k$) used in converting the projection values into input values, are intermittently updated so as to include the influence of contaminations on the touch surface 4. By tracking the influence of contaminations via the updating of the reference values, the touch apparatus compensates for the contaminations already in the input to the reconstruction function, which thereby directly generates the offset pattern. WO2011/049512 and WO2011/028169, as well as Applicant's PCT application WO2013/048312, are all incorporated by reference in their entirety.

Figure 2A:
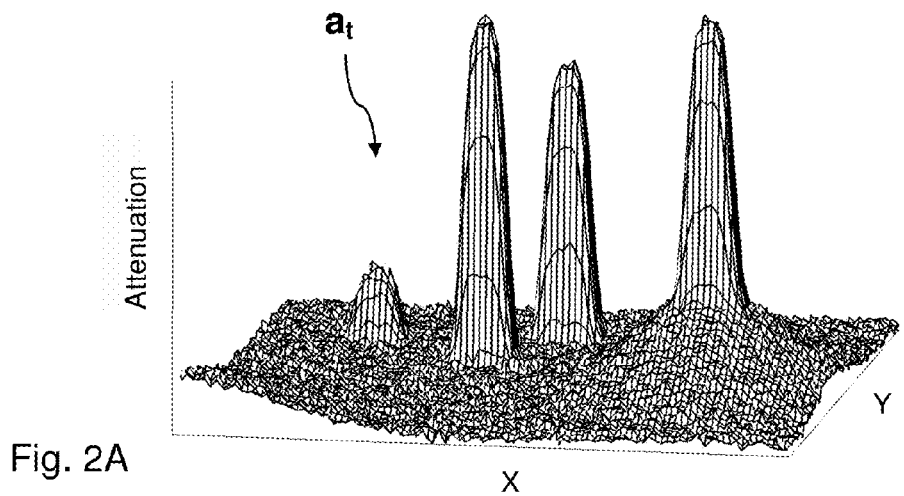
FIGS. 2A-2C are 3D plots of a total attenuation pattern, a background pattern, and an offset pattern, respectively.
Figure 2B:
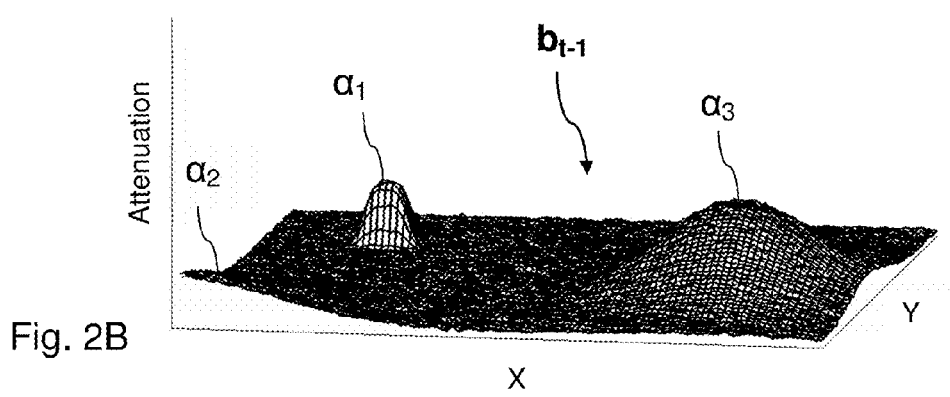
Figure 2C:
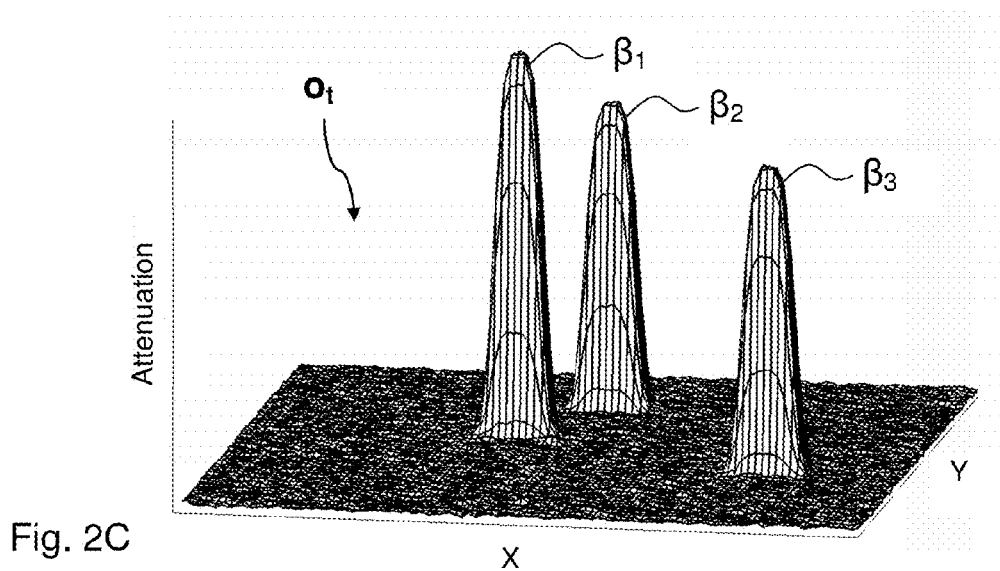

A total pattern $a_t$ is illustrated in FIG. 2A as a 3D plot in the coordinate system X,Y of the touch surface (cf. FIG. 1B). The pattern $a_t$ represents the accumulated attenuation on the touch surface, both from touches and contamination. FIG. 2B is a plot of a background pattern $b_{t-1}$ which exhibits a first attenuation component α1 caused by a fingerprint from an earlier touch, a second attenuation component α2 caused by smear from a palm resting on the touch surface, and a third attenuation component α3 caused by a liquid spill. FIG. 2C is a plot of the offset pattern $o_t$ obtained by subtracting $b_{t-1}$ from $a_t$, pixel by pixel. Three peaks β1, β2, β3 forming three touches are seen against a uniform background level close to zero attenuation.

It is realized that this offset pattern $o_t$ reflects long-term changes in touch-related attenuation on the touch surface, e.g. attenuation changes compared to a clean touch surface without touching objects.

It is also possible to generate a differential attenuation pattern that represents changes on a shorter time scale, typically changes that occur over a time period Δt which is (much) shorter than the temporal extent of traces. Such a differential attenuation patterns is denoted "difference pattern" herein and designated by $da_t$.

The difference pattern $da_t$ may be calculated by subtracting a current offset pattern with a previous one: $da_t = o_t - o_{t-\Delta t}$. Alternatively, the difference pattern $da_t$ may be calculated by subtracting a current total pattern with a previous one: $da_t = a_t - a_{t-\Delta t}$, provided that Δt is selected to be small enough to avoid significant build up of contamination, while being long enough for the movement of touching objects to result in attenuation changes. In one example, the time difference is larger than about 5 ms, preferably about 20-80 ms but may be as large as 1-5 seconds.

In another alternative, the difference pattern $da_t$ may be reconstructed from change values $ds_t$ that are obtained by taking the difference in input values between the current time point (t) and the previous time point (t−Δt):

$$ds_t = s_t - s_{t-\Delta t} = \log\left(\frac{I_{t-\Delta t}}{REF}\right) - \log\left(\frac{I_t}{REF}\right) = -\log\left(\frac{I_t}{REF} \Big/ \frac{I_{t-\Delta t}}{REF}\right) = -\log(I_t/I_{t-\Delta t}),$$

or, equivalently, by the difference in logarithmic signal values:

$$ds_t = -\log(I_t/I_{t-\Delta t}) = \log(I_{t-\Delta t}) - \log(I_t).$$

Thus, the reconstruction function $\mathcal{P}'$ may operate on change values $ds_t$ to generate the difference pattern $da_t$, assuming that the reconstruction function $\mathcal{P}'$ is at least approximately linear:

$$da_t = a_t - a_{t-\Delta t} = \mathcal{P}'(s_t) - \mathcal{P}'(s_{t-\Delta t}) = \mathcal{P}'(s_t - s_{t-\Delta t}) = \mathcal{P}'(ds_t).$$

By operating on change values, the need to calculate, store and retrieve the total pattern or offset pattern at different time points may be obviated.

Further alternatives for generating the difference pattern are disclosed in Applicant's PCT application WO2013/055282, which is incorporated by reference in its entirety.

Figure 3A:
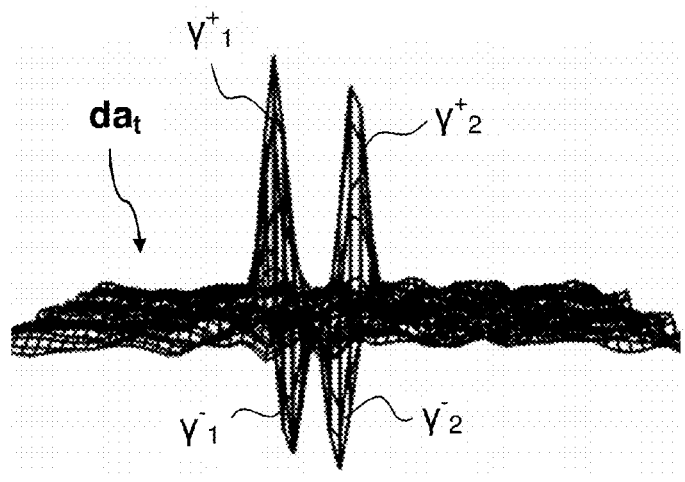
FIGS. 3A-3B are plots of a difference pattern representing two moving objects.
Figure 3B:
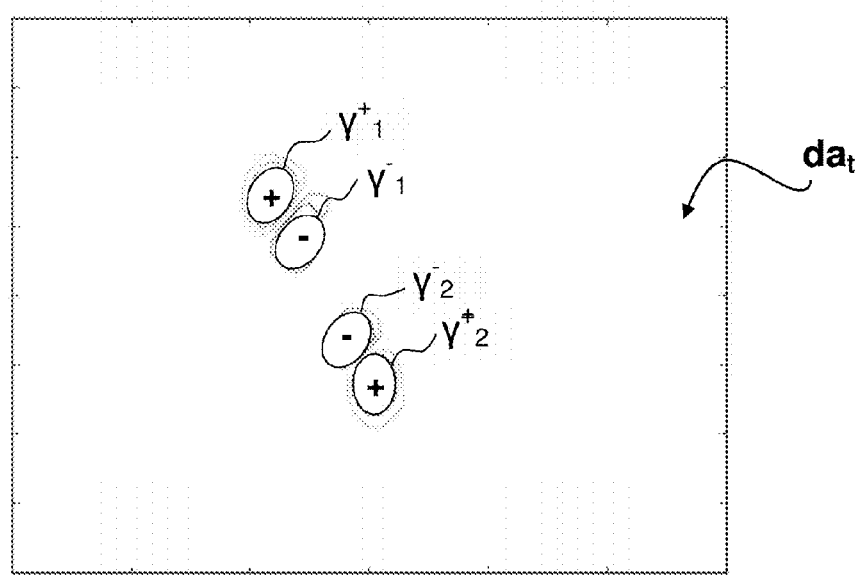

Irrespective of implementation, the difference pattern $da_t$ is a distribution of difference values across the touch surface (or a relevant part of the touch surface), where each difference value may represent a local change (increase/decrease) in attenuation during Δt in a specific position or reconstruction cell (pixel) on the touch surface. The difference pattern $da_t$ may thus be seen as an image of the change in touch interaction and in contamination contribution during Δt across the touch surface. The difference pattern $da_t$ mainly indicates the temporal change in attenuation caused by moving objects in contact with the touch surface, as well objects that are removed from or added to the touch surface during Δt. A moving object generally appears as a "dipole peak" in the difference pattern, i.e. a combination of a positive peak and a negative peak. FIG. 3A is a 3D plot of a difference pattern $da_t$ containing two dipole peaks $\gamma_1^+, \gamma_1^-$ and $\gamma_2^+, \gamma_2^-$. FIG. 3B is a plan view of the difference pattern $da_t$ in FIG. 3A. When an object is moved during Δt, the corresponding touch occupies new pixels, resulting in a positive peak, and leaves old pixels, resulting in a negative peak. If an object is removed from the touch surface, the removed touch will be represented by a single negative peak in the difference pattern, and if an object is brought into contact with the touch surface, the new touch will be represented by a single positive peak. In FIG. 3B, it is realized that the objects have moved away from each other during Δt.

Embodiments of the invention may operate on either the total pattern, the offset pattern or the difference pattern, or combinations of these patterns, to track movement of objects on the touch surface. In the following, reference is therefore made to "attenuation pattern" or "pattern", which is intended to designate all of the above-mentioned types of patterns, unless otherwise stated.

In a real-world implementation, the attenuation pattern will include interferences that make touch identification a demanding task. These interferences may occur as peaks which may be mistaken for true touches. For example, interferences may be caused by measurement noise, artifacts introduced by the reconstruction function, or ambient light, i.e. light that originates from sources outside of the panel and is detected by the sensors. Interferences may also originate from incomplete compensation for contaminations on the touch surface. As will be explained further below, it is also possible that interferences are caused by the light that is scattered by the touching object.

3. Tracking

Figure 4:
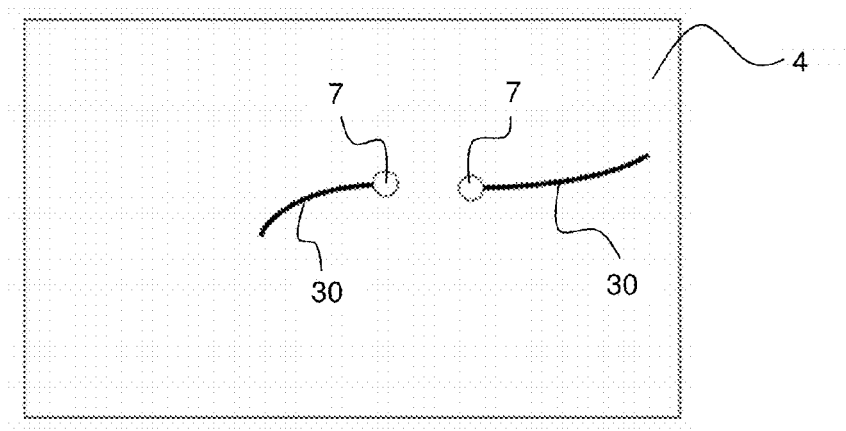
FIG. 4 illustrate movement trajectories of two objects on a touch surface.

The touch apparatus 100 is operated to generate the pattern at consecutive time points, so as to enable the movement of objects on the touch surface to be tracked as a function of time. The tracking results in movement trajectories on the touch surface and may e.g. allow for recognition of user-controlled gestures on the touch surface. As an example, FIG. 4 illustrates movement trajectories 30 of two objects 7 that are dragged on the touch surface 4 in a "pinch" gesture. It is realized that the tracking is a demanding task, especially in the presence of interferences, since it must not only correctly match touches detected at different times, but also correctly detect the occurrence of new touches (i.e. a start of a new movement trajectory, "touch down") and the disappearance of existing touches (i.e. a termination of an ongoing movement trajectory, "touch up"). It is also to be noted that touches may differ significantly in attenuation both within the pattern and as a function of time. For example, moving touches ("drags") are often seen to yield weaker attenuation than stationary touches in an FTIR-based touch apparatus.

Figure 5A:
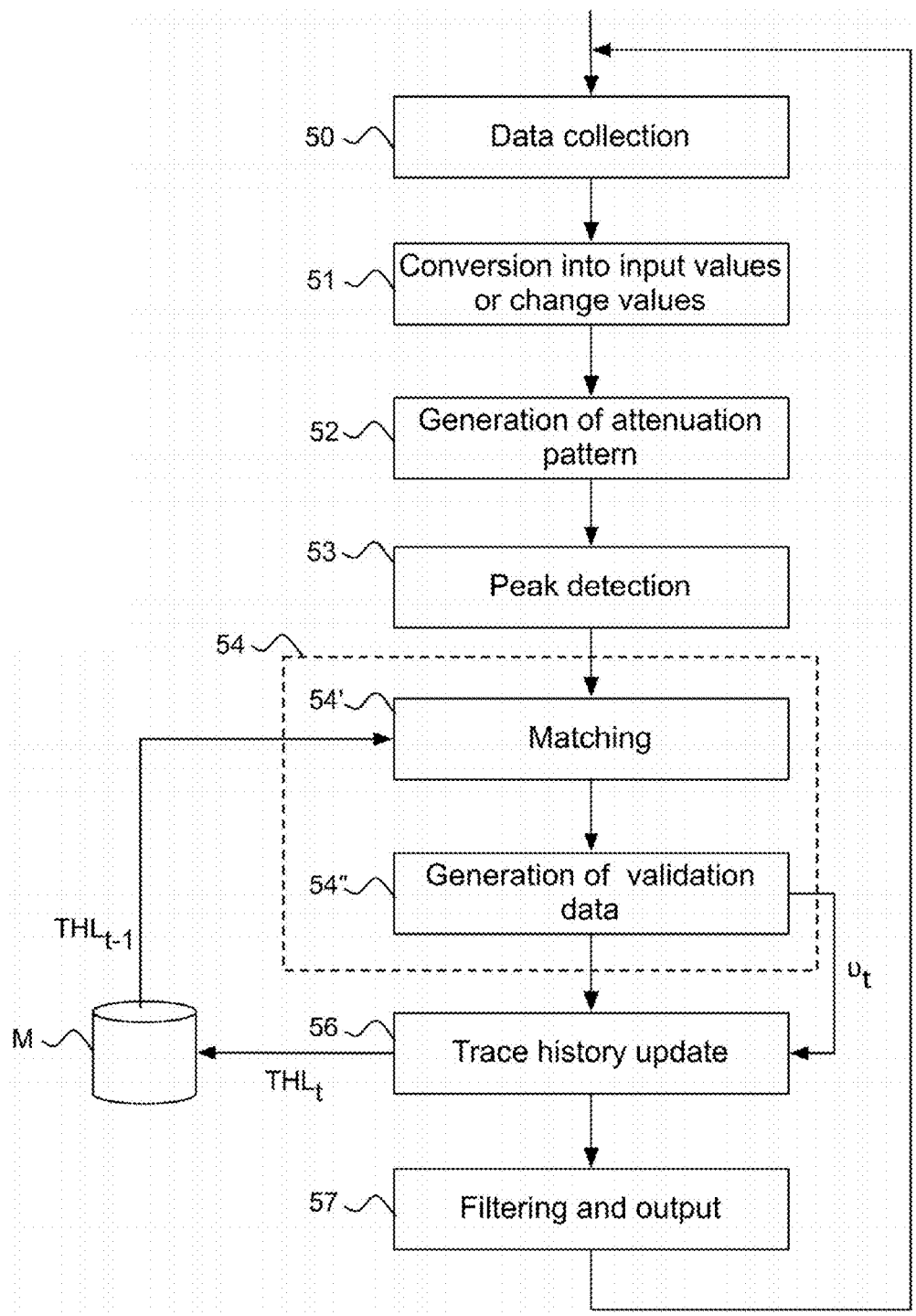
FIG. 5A is a flow chart of a method for tracking objects according to an embodiment of the invention.

FIG. 5A is a flow chart of an embodiment of a method for tracking objects in the touch-sensitive apparatus 100 of FIG. 1. The method involves a sequence of steps 50-57 that are executed repeatedly, typically by the signal processor 10 (FIG. 1). In the context of this description, each sequence of steps 50-57 is denoted a "frame" or an "iteration".

Each frame starts by a data collection step 50, in which the output signal is acquired from the light sensors 3, e.g. by sampling a value from each of the aforesaid projection signals $I_t$. The data collection step 50 results in one projection value for each detection line. It may be noted that the data may, but need not, be collected for all available detection lines in the apparatus 100. The data collection step 50 may also include pre-processing of the projection values, e.g. filtering for noise reduction.

In a conversion step 51, the projection values $I_t$ are processed for conversion into input values $s_t$ or change values $ds_t$, depending on implementation.

A subsequent pattern generation step 52 operates a reconstruction function $\mathcal{P}'$ on the input or change values to generate the pattern, e.g. according to any of the techniques described in Chapter 2.

In a peak detection step 53, the pattern is then processed for detection of peaks, e.g. using any known technique. In one embodiment, a global or local threshold is first applied to the pattern, to suppress noise. Any areas with attenuation values that fall above the threshold may be further processed to find local maxima. The identified maxima may be further processed for determination of a touch shape and a center position, e.g. by fitting a two-dimensional second-order polynomial or a Gaussian bell shape to the attenuation values, or by finding the ellipse of inertia of the attenuation values. Local minima may be identified in similar way. There are also numerous other techniques as is well known in the art, such as clustering algorithms, edge detection algorithms, standard blob detection, water shedding techniques, flood fill techniques, etc. Step 53 results in a peak list which may include values of one of the following peak parameters: peak position, peak size, peak shape, peak attenuation, and peak sign. The peak attenuation may be given by a peak attenuation value or a weighted sum of attenuation values within the peak shape. The peak sign indicates if the peak is positive or negative in the pattern.

A validation step 54 is designed to process the peak list for identification of uncertain peaks ("possibly false peaks"), i.e. peaks that are deemed likely (or deemed not unlikely) to originate from interferences in a broad sense. Conceptually, step 54, may be separated into a matching step 54' and a validation data generation step 54".

The matching step 54' matches the detected peaks in the peak list to existing traces in a trace history list $THL_{t-1}$, which is a record of the existing traces and is retrieved from electronic memory M. The record may be implemented by any suitable data structure, linear or non-linear, such as list, a hash table, a binary tree, etc. The trace history list is maintained to contain values of trace parameters for the traces deemed relevant to the current frame, e.g. all traces deemed to exist, which also may include any traces deemed not unlikely to exist. As indicated above, the trace parameters may e.g. include age, location, location history, attenuation strength, size, and shape for each existing trace. In FIG. 5A, the trace history lists updated in the latest frame and in the current frame are indicated by $THL_{t-1}$ and $THL_t$, respectively. Step 54' results in a match list indicating matched peaks, non-matched peaks and non-matched traces.

The validation data generation step 54" processes the peak list and/or the match list for identification of uncertain peaks. To this end, step 54" applies rules that stipulate forbidden or allowed features of the detected peaks. These rules typically make use of at least peak location and peak sign to determine if a peak is potentially false or not. The step 54" results in validation data $v_t$ which indicates the uncertain peaks.

In an updating step 56, the trace history list $THL_{t-1}$ is updated based on the match list and the validation data $v_t$. The updating step is thus implemented to update relevant trace parameters of existing traces, to remove terminated traces and to insert relevant trace parameters for new traces. The updated trace history list $THL_t$ is stored in memory M for use by the matching step 54" in a forthcoming frame.

Different embodiments and exemplifying combinations of steps 54 and 56 as well as examples of validation data are given in Chapters 4 and 5 below.

In step 57, current touch data is determined and output, whereupon the process returns to the data collection step 50. The current touch data may be determined by selecting values determined during the peak detection, matching or updating steps 53, 54', 56, such as peak parameter values or trace parameter values. Step 57 may output touch data for all existing and new traces as identified in step 56. However, it is conceivable that step 57 implements an "output filter", which manipulates the current touch data to improve the user experience. For example, the output filter may postpone output of current touch data for new traces for a number of frames to suppress the influence of erroneous peak detections. Likewise, the output filter may be configured to delay removal of a non-matched trace for a number of frames, e.g. by outputting the latest touch data for the non-matched trace during these frames or by outputting touch data that is projected for these frames based on the trace parameter values in the touch history list. It is also conceivable that the output filter is configured to make an active selection among the traces found in step 56 and only output current touch data for the selected traces.

With reference to the embodiment in FIG. 5A, and variants thereof, it is to be understood that one or more of the indicated steps may be effected concurrently. For example, the data collection step 50 of a subsequent frames may be initiated concurrently with any one of the steps 51-57.

Figure 5B:
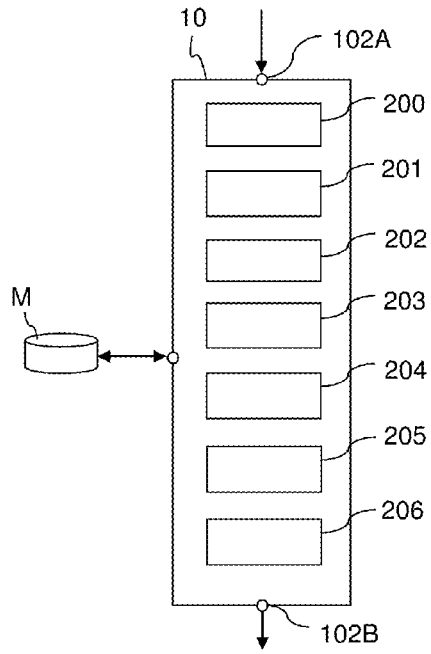
FIG. 5B is a block diagram of a structure for implementing the method in FIG. 5A.

The above-described method may be implemented by a data processing device (cf. 10 in FIG. 1) which is connected to sample the measurement values from the light sensors 3 in the FTIR system. FIG. 5B shows an example of such a data processing device 10, which includes an input 102A for receiving the output signal. The device 10 further includes a data collection element (or means) 200 for obtaining the current projection values, a conversion element (or means) 201 for converting the current projection values into current input values or change values, a pattern generation element (or means) 202 for generating a current attenuation pattern, a peak detection element (or means) 203 for detecting peaks in the current attenuation pattern, a validation element (or means) 204 for matching peaks to existing traces and for validating peaks according to the rules described herein, an updating element (or means) 205 for updating the trace history list, an outputting element (or means) 206 for providing current touch data for output, and an output 102B for outputting the current touch data.

The device 10 may be implemented by special-purpose software (or firmware) run on one or more general-purpose or special-purpose computing devices. In this context, it is to be understood that each "element" or "means" of such a computing device refers to a conceptual equivalent of a method step; there is not always a one-to-one correspondence between elements/means and particular pieces of hardware or software routines. One piece of hardware sometimes implements different means/elements. For example, a processing unit may serve as one element/means when executing one instruction, but serve as another element/means when executing another instruction. Naturally, it is conceivable that one or more elements (means) are implemented entirely by analog hardware components.

The software controlled device 10 may include one or more processing units (cf. 14 in FIG. 1B), e.g. a CPU ("Central Processing Unit"), a DSP ("Digital Signal Processor"), an ASIC ("Application-Specific Integrated Circuit"), discrete analog and/or digital components, or some other programmable logical device, such as an FPGA ("Field Programmable Gate Array"). The device 10 may further include a system memory and a system bus that couples various system components including the system memory to the processing unit. The system bus may be any of several types of bus structures including a memory bus or memory controller, a peripheral bus, and a local bus using any of a variety of bus architectures. The system memory may include computer storage media in the form of volatile and/or non-volatile memory such as read only memory (ROM), random access memory (RAM) and flash memory. The special-purpose software, the trace history list and any other data needed during execution, may be stored in the system memory, or on other removable/non-removable volatile/non-volatile computer storage media which is included in or accessible to the computing device, such as magnetic media, optical media, flash memory cards, digital tape, solid state RAM, solid state ROM, etc. The data processing device 10 may include one or more communication interfaces, such as a serial interface, a parallel interface, a USB interface, a wireless interface, a network adapter, etc, as well as one or more data acquisition devices, such as an A/D converter. The special-purpose software may be provided to the device 10 on any suitable computer-readable medium, including a record medium, and a read-only memory.

4. Maintaining the Trace History List

Figure 6:
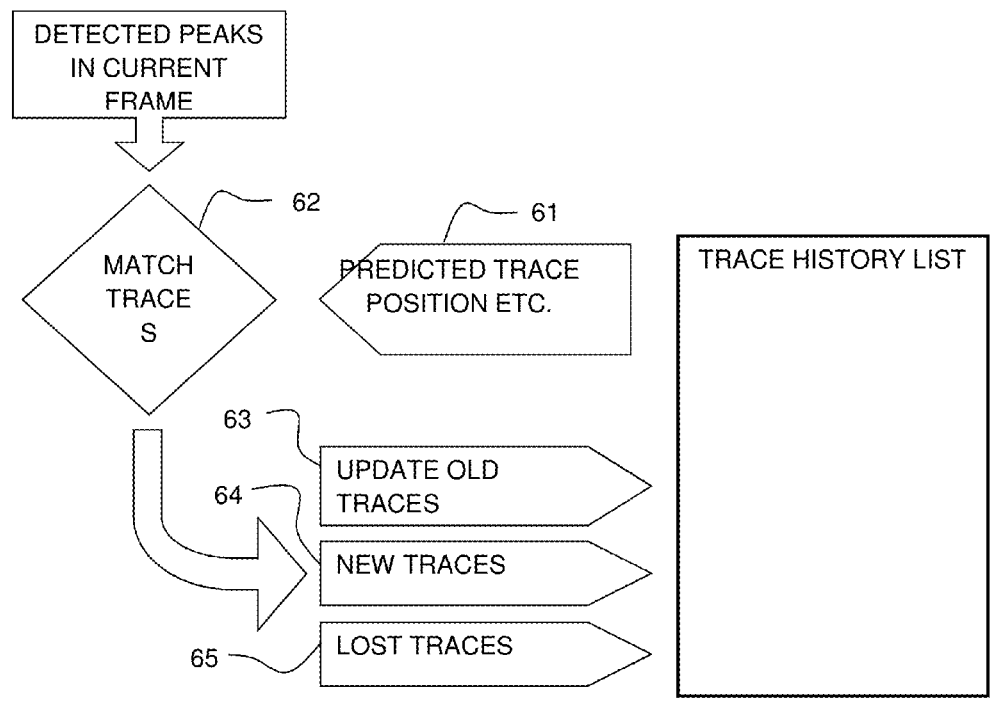
FIG. 6 illustrates a process of maintaining a trace history list which is used in the method of FIG. 5A.

The process of maintaining the trace history list according to steps 54 and 56 will now be briefly explained with reference to FIG. 6, while omitting the generation and use of validation data. The aim of such a maintaining process is to, based on identified matches between current peaks (detected in step 53) and traces in the trace history list $THL_{t-1}$, update the trace history list with current trace parameter values. In FIG. 6, steps 61-62 belong to the matching step 54' and steps 63-65 belong to the updating step 56.

In step 61, the trace parameter values for the traces in the trace history list $THL_{t-1}$ are processed for generating predicted values for the current frame. Depending on implementation, step 61 may operate to predict the most likely location (coordinates), size and shape for all traces in the trace history list. Step 61 may be omitted, but is currently believed to improve the quality of the distance measures when computing match values (below).

In step 62, the (predicted) values of the trace parameters are matched against corresponding parameter values for the peaks in the peak list. Thereby, a match value is computed between every peak and every trace in the trace history list. The match value indicates the likelihood of a match between the peak and a specific trace.

The match value may, e.g., be computed as a function of the Euclidian distance between the location of the peak and the (predicted) location of the trace, and/or as a function of a similarity in size and/or shape and/or attenuation strength. Also, invalid match values may be set for peak-trace combinations that are deemed impossible. One limitation for peak-trace combinations may be given by a maximum distance between the (predicted) location of the peak and the location of the trace. In one example, a match is deemed impossible if the distance is greater than 15 mm. Imposing restrictions on allowed peak-trace combinations also makes it possible to use smarter algorithms for the match value computations, for example a hierarchical search over the touch surface.

It is to be understood that the match values may be computed to factor in further trace parameters included in the trace history list, e.g. the age of the trace.

In a total pattern and an offset pattern, a touching object is represented by a positive peak. For these types of patterns, step 62 may ignore all negative peaks, i.e. only positive peaks are matched against existing traces. In a difference pattern, a touching object may be represented by both a positive and a negative peak (cf. FIG. 3). For difference patterns, step 62 may match either positive peaks or negative peaks, or a combination thereof, against existing traces.

In step 62, the identified peaks are also assigned (i.e. matched) into the trace history list based on the match values, so as to determine one trace (if any) as a best match for each peak. A simple way to do this assignment, if the match values are calculated to represent a better match by a higher match value, is to start with the highest match value and proceed to gradually lower match values (a greedy approach), and vice versa if a better match is represented by a lower match value. There are many other and more elaborate algorithms for making this assignment, such as Hungarian method (Kuhn's algorithm) or any other algorithm solving bipartite matching based on match values. In an alternative, the assignment accounts for the age of the trace associated with the respective match value, e.g. by starting with the oldest match value/trace (largest value of age parameter) and proceeding to gradually younger match values/traces.

Step 62 results in the above-mentioned match list, in which each peak is either assigned to a trace ("matched peak") or is identified as lacking an assigned trace ("non-matched peak").

Likewise, each trace is either assigned to a peak or is identified as lacking an association ("non-matched trace").

In step 63, the trace history list is updated for all matched peaks, by updating the corresponding trace parameters as a function of the peak parameter values for the matched peak or peaks.

In step 64, non-matched peaks are interpreted as new traces and are added to the trace history list Like in step 63, the trace parameter values may be given by, or calculated as a function of, the peak parameter values.

In step 65, non-matched traces are interpreted as lost traces and are removed from the trace history list. In one variant, the removal of such a trace is delayed for a few (e.g. 1-10) frames to make it possible to find peaks belonging to the trace in a later frame. This may e.g. avoid removal of weak traces that may be temporarily hidden in noise or artifacts. In another variant, non-matched traces are removed if one or more trace parameter values fulfils a given criterion, e.g. if the local noise has decreased below what is expected, or if the attenuation strength of a trace has decreased rapidly over a sequence of preceding frames (which may indicate that the corresponding object is being lifted from the touch surface).

5. Peak Validation and Use of Validation Data

As understood from FIG. 5A, step 54" for generating validation data may be executed between step 62 and steps 63-65 in FIG. 6, and steps 63-65 may be configured to take into account the validation data generated by step 54".

Step 54" applies a set of rules to find uncertain peaks among the peaks. The rules are tailored to find false peaks that are caused by phenomena specific to an FTIR system. Embodiments of the invention will now be described with respect to two such phenomena: light scattering and contamination (residue) changes.

5.1 False Peaks Caused by Light Scattering

Light scattering is a physical process that causes some of the propagating light in the panel to deviate from its original path. In an FTIR system, there may be inherent scattering in the panel, e.g. scattering caused by irregularities in the boundary surfaces that define the radiation propagation channel, and scattering caused by irregularities in the bulk material of the panel. This scattering may be invariant over time and may be taken into account by calibration of the apparatus.

In an FTIR system, light scattering may also be caused by the touching objects, as well as contaminations on the touch surface, such as fingerprints and smear. This type of light scattering is dynamic, i.e. it changes as the system is used since both the location of the objects and the distribution of contamination may vary over time. Furthermore, light scattering may differ depending on the type of object and how hard the object is pressed against the touch surface. Likewise, light scattering may differ for different types of contamination, e.g. fingerprints and liquid spills. For example, the pattern of valleys and ridges on a human finger or in a fingerprint may cause irregular scattering of light, as well as interference/diffraction phenomena depending on the coherence of the propagating light.

Figures 7A, 7B, 7C, 7D:
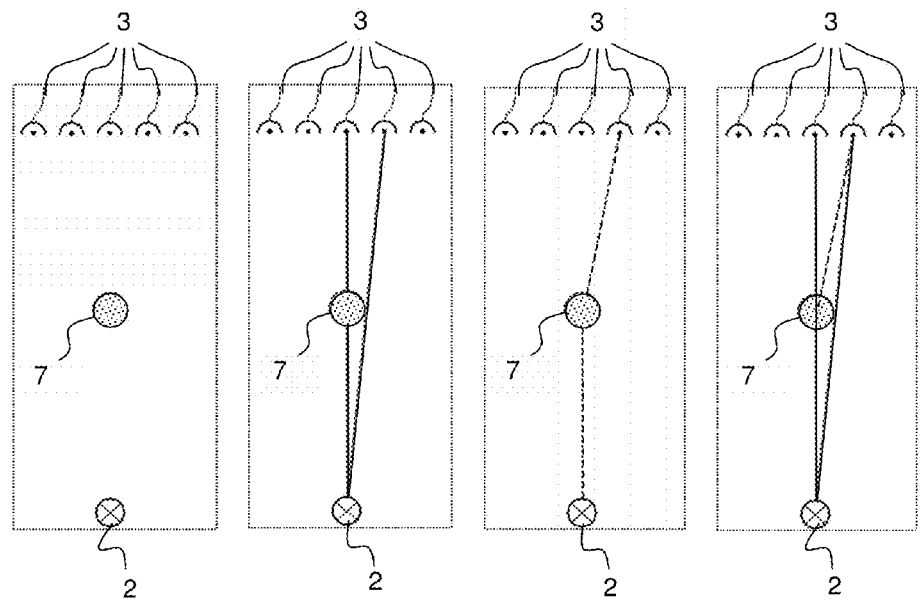
FIGS. 7A-7D are plan views of an FTIR system to illustrate how interferences may be caused by light scattering.

FIGS. 7A-7D illustrate the impact of light scattering on the projection values measured by light sensors 3 in an FTIR system. For the purpose of simplification, the system is illustrated with one light emitter 2 and five light sensors 3. In FIG. 7A, an object 7 is brought into contact with the touch surface. In FIG. 7B, it is assumed that the apparatus is free of dynamic light scattering. The emitter 2 is activated to generate a first and a second detection line. The first detection line passes directly through the contact area between the object 7 and the touch surface, resulting in a decreased projection value (i.e. an increased attenuation). The second detection line passes directly to the right of the contact area and will result in an unchanged projection value (i.e. no attenuation). FIG. 7C illustrate the effect of dynamic light scattering. Some of the light that hits the contact area along is scattered by the object and impinges on the sensor of the second detection line. Thus, as shown in FIG. 7D, the projection value of the second detection line will represent the sum of the propagating light reaching its sensor (FIG. 7B) and the scattered light reaching its sensor (FIG. 7C). This results in an increased projection value (i.e. a decreased attenuation) for the second detection line. The discussion in relation to FIG. 7 is equally applicable when the object 7 is replaced by a local contamination, such as a fingerprint.

If the object 7 in FIG. 7D is now lifted from the touch surface (or equivalently, if the local contamination is at least partly removed), the projection value of the first detection line will increase while the projection value of second detection line will decrease (since the scattered light is removed). Thus, the attenuation for the second detection line will increase, which may result in a positive peak in the resulting pattern that may be erroneously interpreted as a new touch.

Figure 8:
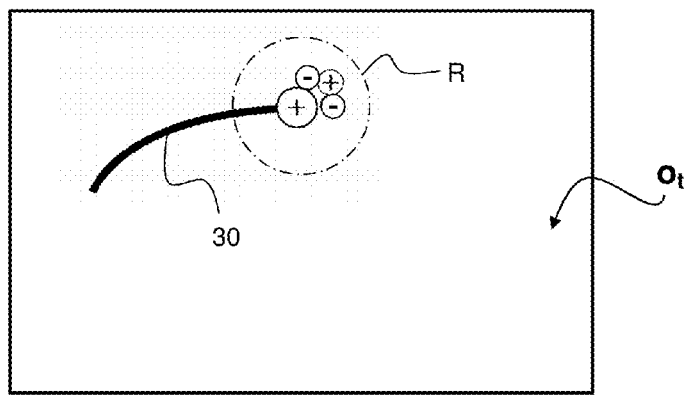
FIG. 8 is a plot of an offset pattern containing a true peak and false peaks caused by light scattering.

It is realized that the dynamic light scattering results in a re-distribution of light energy between detection lines. Typically, but not generally, the dynamic light scattering affects detection lines that pass close to the scattering object/contamination. This will lead to a re-distribution of attenuation in the resulting pattern (generated in step 52 in FIG. 5A). Since no new light is created by the light scattering, the sum of the re-distributed attenuation in the pattern should be zero. This means that dynamic light scattering results in both positive and negative peaks in the pattern. These scattering-induced peaks typically emanate as local phenomena around the scattering object/contamination. FIG. 8 is a schematic illustration of a trace 30 overlaid on an offset pattern ($o_t$), which contains peaks that originate from a single touching object. The peaks form a confined group with two positive peaks and two negative peaks. One of the positive peaks, which corresponds to the object, has been matched to the trace 30, whereas the other three peaks are non-matched peaks. The validation step 55 is designed to ensure that one or more of these non-matched peaks are not entered into the trace history list as new traces in the updating step 56.

In one embodiment, step 54" applies a "scatter heuristic" that includes a first rule that stipulates that a positive peak associated with (e.g. located in the vicinity of) one or more negative peaks is to be designated as an uncertain peak. In another variant, the first rule applies only to non-matched positive peaks, such that only one the non-matched peak in FIG. 8 is designated as uncertain. The first rule may be applied to positive peaks located, together with one or more negative peaks, within a search region of given extent. The search region may, e.g. be defined around each negative peak. In a variant, indicated in FIG. 8, the search region R is defined around one or more of the positive peaks, e.g. the positive peak that has been matched to trace 30. The extent of the search region R may be set in dependence of the design of the touch-sensitive apparatus, the reconstruction function used in step 52 and the maximum conceivable size of the scattering object/contamination. In one non-limiting example, the search region R is set to a diameter in the range of 1-50 mm. In an alternative, the positive peaks associated with negative peaks are identified by searching the peaks for specific spatial combinations of positive and negative peaks, e.g. the quadropole of positive and negative peaks shown in FIG. 8. This "spatial pattern recognition" may also factor in attenuation strength, size, shape, etc of the individual peaks.

From FIG. 3B, it is realized that a difference pattern may present negative peaks that do not originate from interferences, but actually occur along the movement trajectory (trace) of a touching object. Thus, when operating on difference patterns, the first rule applied in step 54" may, but need not, be modified to stipulate that positive peaks are to be designated as uncertain peaks only if the associated negative peak (or peaks) is (are) spatially separated from the current traces. Such a modified first rule may also be applied to offset patterns, which may present similar negative peaks, e.g. caused by delayed or incomplete contamination compensation.

In a further variant, the scatter heuristic may include a second rule that all negative peaks are to be designated as uncertain peaks, so as to prevent negative peaks from being introduced into the trace history list. However, the skilled person realizes that there are other ways of excluding negative peaks, e.g. to exclude all negative peaks in the matching step 54' and/or to prevent the use of any negative peak in the updating step 56.

Based on the scatter heuristic, step 54" generates validation data that indicates the uncertain peaks. The validation data may be added to the peak list (generated in step 53) or the match list (generated in step 54'), or it may be provided in a separate data structure for access by the updating step 56. The validation data may take different forms. In a first variant, the validation data is an indicator (flag, marker, value, etc) associated with a peak to indicate that the peak is either uncertain or true. In a second variant, step 54" operates to delete the uncertain peaks from the peak list, whereby the validation data is implicitly embedded into the peak list. In a third variant, step 54" operates to determine a probability value for the detected peaks, where the probability value indicates the likelihood that a particular peak is false (or true). The probability value may be represented as a numerical value, in any base, or as a logical value. In a fourth variant, the validation data is given as an uncertainty region in the offset pattern. The uncertainty region will signal to the updating step 56 that peaks in this region may be false. The uncertainty region may, but need not, correspond to the above-mentioned search region (R in FIG. 8).

The updating step 56 takes the validation data into account when updating the trace history list. In one embodiment, step 63 may be designed to refrain from updating an existing trace based on a matched peak that is deemed uncertain. In another embodiment, step 64 is designed to refrain from adding a new trace to the trace history list based on a non-matched (positive) peak that is deemed uncertain.

In yet another embodiment, step 63 and/or step 64 may be designed to tentatively track such uncertain peaks for a number of subsequent iterations, to postpone the decision to update the existing trace and add the new trace, respectively. Such tentative traces may be tracked separately from the trace history list. Alternatively, they may be included in the trace history list, but designated as tentative trace paths and tentative new traces, respectively. A trace validation step (not shown) may be implemented to take the decision to update when it is verified that the tentatively tracked peak actually forms a trace over the subsequent iterations, or that the tentative trace has a sufficient extent on the touch surface. The trace validation step may also be implemented to decide if such a verified tentative trace should be connected to an existing trace in the trace history list or be added as a new trace. The trace validation step may also delete other tentative traces from the trace history list.

In a variant of the method in FIG. 5A, step 54" is executed before the matching step 54' in the validation step 54. The above description of steps 50-57 is equally applicable to such a variant. However, it is conceivable that the matching step 54' is configured to use the validation data to improve the matching process, e.g. to factor in the probability values/uncertainty region when calculating the match values.

It is realized that the scatter heuristic will reduce the likelihood that peaks caused by scatter phenomena are identified as indicative of touching objects of the touch surface of an FTIR-based system. Furthermore, the scatter heuristic may serve to suppress the influence of peaks that originate from other types of interference.

5.2 False Peaks Caused by Contamination Changes

When an object is moving along a trajectory on the touch surface, it may change the contamination on the touch surface. For example, if the object is a finger, it may both add finger grease to the touch surface and rearrange existing contamination on the touch surface. Such contamination changes or "residue changes" may be interpreted as peaks in the pattern, even if the pattern generation step 52 is implemented to actively compensate for contaminations, or otherwise suppress the influence of contaminations.

Figure 9A:
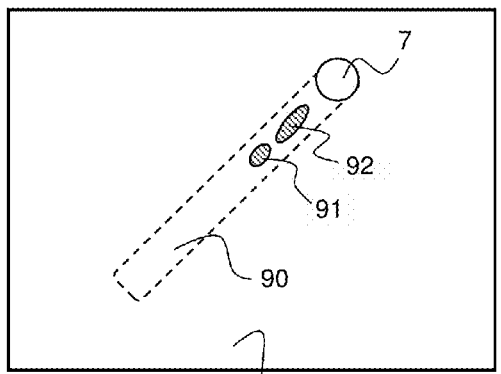
FIGS. 9A-9B are plan views of an FTIR system to illustrate how interferences may be caused by changes in contamination.
Figure 10:
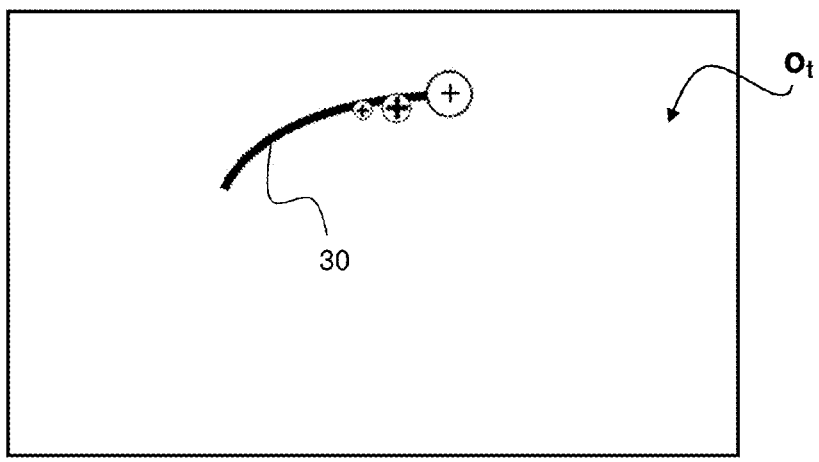
FIG. 10 is a plot of an offset pattern containing a true peak and false peaks caused by changes in contamination.
Figure 11:
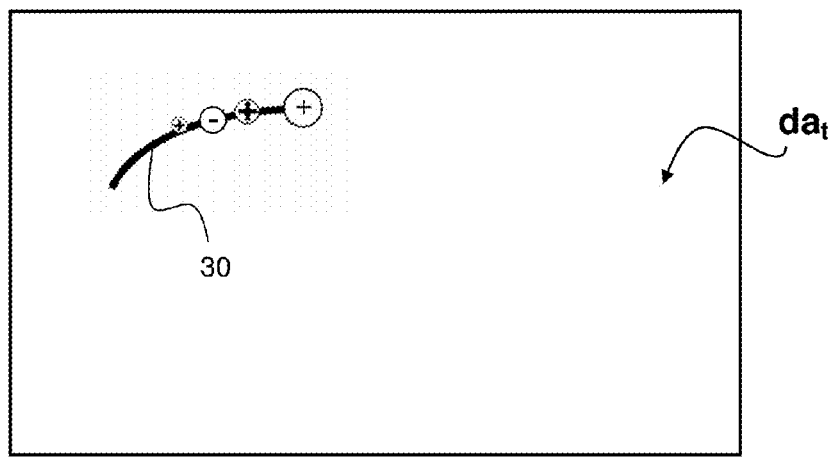
FIG. 11 is a plot of a difference pattern containing true peaks and false peaks caused by changes in contamination.

FIG. 9A is a schematic view of an object 7 on a touch surface 4, where the object has left a trail 90 of contamination as indicated by dashed lines. The attenuation caused by the trail 90 may be estimated and compensated for by existing techniques. However, it may be difficult to fully compensate for the influence of the contaminations, especially if the contaminations are unevenly distributed along and within trail 90. As an example, FIG. 9A indicates two areas 91, 92 in which the contamination is significantly more than expected. Thereby, the areas 91, 92 will result in positive peaks along a movement trajectory in the pattern. This is further illustrated in the offset pattern $o_t$ of FIG. 10, in which two positive non-matched peaks caused by locally increased contamination are observed along an existing trace 30 for a single touching object. Similar interference may occur in a difference pattern $da_t$, as illustrated in FIG. 11, where trace 30 contains a positive peak at the front end of trace 30 caused by the movement of the object into a new area on the touch surface during $\Delta t$, a negative peak is caused by the movement of the object away from its previous location, and two positive peaks caused by newly added fingerprints that lead to locally increased attenuation.

Figure 9B:
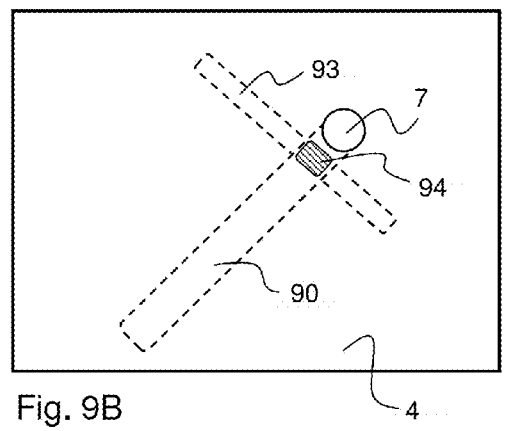

FIG. 9B is a schematic view of an object 7 on a touch surface 4 which has an old trail 93 of contamination thereon. The object 7 has been moved on the surface 4 while wiping away some of the contamination in the trail 93, while depositing a new trail 90 of contamination on the surface 4. If the contamination in trail 93 is not properly estimated when the pattern is generated (step 52 in FIG. 5A), the amount of contamination may be either underestimated or overestimated in area 94, resulting in a positive or negative peak along the trace of the object.

To reduce the likelihood that contamination-induced positive peaks are entered into the trace history list as new traces in the updating step 56, step 54" may apply a "contamination heuristic" including a third rule that stipulates that a positive peak is to be designated as uncertain if it is located along an existing trace. The contamination heuristic may contain a fourth rule that stipulates that such a positive peak is to be designated as uncertain only if it is non-matched to existing traces (cf. step 54'). The fourth rule will allow the method to track a touch that crosses another trace, since matched peaks are not identified by the contamination heuristic.

It is conceivable that the contamination heuristic also includes a fifth rule that stipulates that the positive (matched or non-matched) peak is to be designated as an uncertain peak only if it is located within a maximum distance from the front end of the existing trace. The fifth rule may reduce the risk that new touches that occur in existing traces are designated as uncertain peaks and prevented from being added to the trace history list in step 56. Since contamination-induced peaks are likely to occur relatively close to the front end of the trace, the fifth rule may be used without introducing false peaks into the trace history list. The maximum distance used in the fifth rule may be a Euclidian distance or a distance along the trace. In one implementation, the maximum distance is a fixed, absolute distance. In another implementation, the maximum distance is set dynamically as a function of the trace velocity, such that a higher trace velocity results in a larger maximum distance. This will ensure that the contamination-induced peaks are designated as uncertain also for objects move quickly across the touch surface. In one example, the maximum distance is an extent along the trace, from its current position to its previous position a given number of frames back in time, e.g. 5, 10 or 20 frames. Thereby, the positive peak will be designated as uncertain only if it falls within the recent trajectory of the trace, where the extent of the recent trajectory automatically scales with the velocity of the trace.

The validation data may be given in any of the above-discussed formats, and may be used as described for scattering-induced peaks. If the validation step 54" is implemented to precede the matching step 54', step 54" may be designed to omit the fourth rule (and possibly the fifth rule), whereby all positive peaks that fall on existing traces are designated as uncertain peaks. Optionally, the fourth rule (and possibly the fifth rule) may be applied in the updating step 56, which may be designed to include such an uncertain peak in the trace history list if the uncertain peak has been reliably matched to an existing trace in the matching step 54'.

While the invention has been described in connection with what is presently considered to be the most practical and preferred embodiments, it is to be understood that the invention is not limited to the disclosed embodiments, but on the contrary, is intended to cover various modifications and equivalent arrangements included within the spirit and the scope of the appended claims.

For example, the format of the input values $s_t$ depends on (or is given by) the reconstruction function $\mathcal{P}'$ and the desired/required accuracy of the reconstructed pattern. In alternative implementations, the format may e.g. be given as a transmission (e.g. given by the projection value normalized by the reference value), an energy difference (e.g. given by the difference between the projection value and the reference value), or a logarithm of the energy difference. As used hereinabove, a "logarithm" is intended to also encompass functions approximating a true logarithmic function, in any base. Furthermore, the input values may have any sign, i.e. they may or may not be multiplied by a negative value. Depending on the reconstruction function, it may even be possible to use the projection values as input values. Similar modifications may be made with respect to the generation of the difference pattern. Thus, on a more general level, the above-mentioned total, offset and difference patterns may be regarded as "interaction patterns" that comprise a distribution of changes in local interaction with propagating light caused by one or more touching objects.

The invention claimed is:

1. A method of tracking movement of one or more objects on a touch surface of a touch-sensitive apparatus, the touch-sensitive apparatus being operable to propagate light by internal reflections inside a light transmissive panel from a plurality of incoupling points to a plurality of outcoupling points so as to illuminate the touch surface from within the light transmissive panel, wherein at least one light detector is optically coupled to the outcoupling points to generate an output signal representing received light at the outcoupling points, said method comprising the steps of:

processing the output signal to generate an interaction map that indicates local changes in interaction on the touch surface;

processing the interaction map for identification of positive and negative apparent peaks, wherein each positive apparent peak represents a locally increased interaction in the interaction map and each negative apparent peak represents a locally decreased interaction in the interaction map;

processing the positive and negative apparent peaks to identify potentially false peaks among the positive and negative apparent peaks;

and updating, based on the potentially false peaks, movement trajectories of all objects deemed to exist on the touch surface at a preceding time point, wherein the step of processing the positive and negative apparent peaks applies at least one of a first heuristic and a second heuristic for identifying the potentially false peaks, said first heuristic designating a positive apparent peak as a potentially false peak when the positive apparent peak is deemed to be associated with one or more of the negative apparent peaks, and said second heuristic designating a positive apparent peak as a potentially false peak when the positive apparent peak is deemed to be located along one of the movement trajectories.

2. The method of claim 1, wherein the first heuristic further requires said one or more of the negative apparent peaks to be located outside the movement trajectories.

3. The method of claim 1, wherein the positive apparent peak is deemed to be associated with said one or more negative apparent peaks when the positive apparent peak has a given spatial relation to said one or more negative apparent peaks.

4. The method of claim 3, wherein the given spatial relation defines a maximum distance between the positive apparent peak and said one or more negative peaks.

5. The method of claim 1, wherein the step of processing the negative and positive apparent peaks comprises a step of matching at least part of the positive and negative apparent peaks to the movement trajectories, so as to identify a set of matched apparent peaks and a set of non-matched apparent peaks.

6. The method of claim 5, wherein the second heuristic further requires, to designate the positive apparent peak as a potentially false peak, that the positive apparent peak is included in said set of non-matched apparent peaks.

7. The method of claim 1, wherein the second heuristic further requires, to designate the positive apparent peak as a potentially false peak, that the positive apparent peak is located within a maximum distance from a current location of said one of the movement trajectories.

8. The method of claim 7, wherein the maximum distance is a distance along said one of the movement trajectories, and wherein the second heuristic is configured to dynamically set the maximum distance to increase with increasing velocity of said one of the movement trajectories.

9. The method of claim 1, wherein the step of updating comprises: evaluating, based on the potentially false peaks, the positive and negative apparent peaks for determination of a current location for at least part of the movement trajectories; evaluating, based on the potentially false peaks, the positive and negative apparent peaks for identification of new touches; and adding the location of each of said new touches as a starting point of a new movement trajectory.

10. The method of claim 9, wherein the step of updating comprises: preventing the identification of new touches based on the potentially false peaks.

11. The method of claim 10, which operates in successive repetitions of the steps of processing and updating, wherein the identification of new touches based on the potentially false peaks is prevented during a number of successive repetitions for at least part of the potentially false peaks.

12. The method of claim 9, wherein the step of updating comprises at least one of:
   a) updating the movement trajectories based on said at least part of the positive and negative apparent peaks while omitting all potentially false peaks;
   b) updating the movement trajectories based on said at least part of the positive and negative apparent peaks while applying a respective peak probability value indicative of the potentially false peaks;
   c) postponing the updating of at least a subset of movement trajectories that are deemed to be associated with the potentially false peaks;
   d) creating tentative movement trajectories for at least a subset of the potentially false peaks; and
   e) postponing the updating of movement trajectories that are deemed to be associated with one or more uncertainty regions containing the potentially false peaks in the interaction map.

13. The method of claim 1, further comprising: identifying current touch data for at least part of the updated movement trajectories, and outputting the touch data.

14. The method of claim 1, wherein the step of processing the output signal comprises: processing the output signal to identify signal values for a plurality of light paths extending between pairs of incoupling and outcoupling points, and generating the interaction map by operating an image reconstruction algorithm on the signal values.

15. The method of claim 1, wherein the interaction is represented as one of an attenuation and a transmission of said light.

16. The method of claim 1, further comprising: retrieving, from an electronic memory, a data structure indicative of the movement trajectories of all objects deemed to exist on the touch surface at the preceding time point, wherein the step of updating comprises updating the movement trajectories in the data structure, and storing the updated data structure in the electronic memory.

17. A non-transitory computer program product comprising computer code which, when executed on a data-processing system, is adapted to carry out the method of claim 1.

18. A device for tracking movement of one or more objects on a touch surface of a touch-sensitive apparatus, the touch-sensitive apparatus being operable to propagate light by internal reflections inside a light transmissive panel from a plurality of incoupling points to a plurality of outcoupling points so as to illuminate the touch surface from within the light transmissive panel, wherein a light sensing means is optically coupled to the outcoupling points to generate an output signal representing received light at the outcoupling points, said device comprising:
   means for processing the output signal to generate an interaction map that indicates local changes in interaction on the touch surface;
   means for processing the interaction map for identification of positive and negative apparent peaks, wherein each positive apparent peak represents a locally increased interaction in the interaction map and each negative apparent peak represents a locally decreased interaction in the interaction map;
   means for processing the positive and negative apparent peaks to identify potentially false peaks among the positive and negative apparent peaks;
   and means for updating, based on the potentially false peaks, movement trajectories of all objects deemed to exist on the touch surface at a preceding time point,
   wherein the means for processing the positive and negative apparent peaks is configured to apply at least one of a first heuristic and a second heuristic for identifying the potentially false peaks, said first heuristic designating a positive apparent peak as a potentially false peak when the positive apparent peak is deemed to be associated with one or more of the negative apparent peaks, and said second heuristic designating a positive apparent peak as a potentially false peak when the positive apparent peak is deemed to be located along one of the movement trajectories.

* * * * *